Nov. 8, 1960    R. M. DAVIES    2,959,090
DEVICE FOR INSPECTING A BODY SURROUNDED
BY, OR COMPOSED OF, HOT GASES
Filed June 16, 1958
FIG. 1
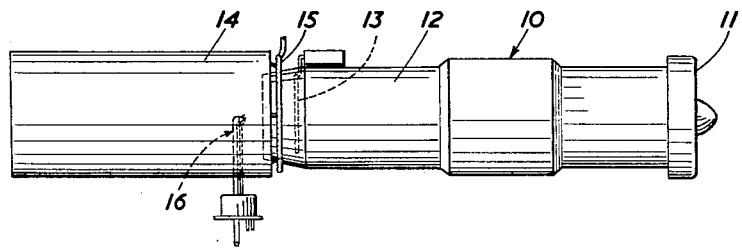
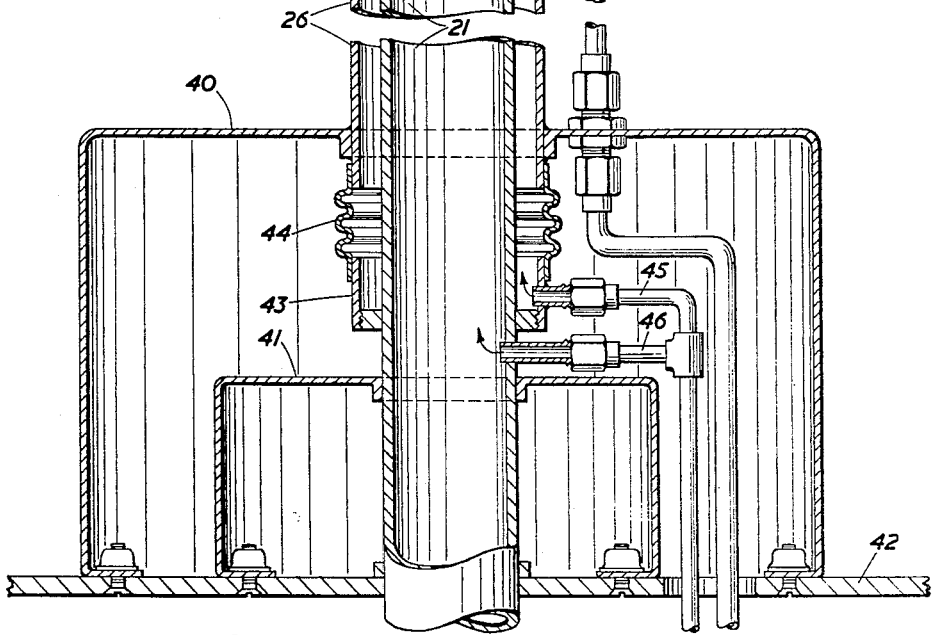
FIG. 3    FIG. 4
FIG. 2
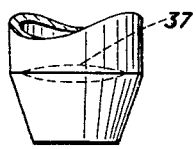
INVENTOR
RONALD MILTON DAVIES
BY: *Maybee & Legris*
ATTORNEYS United States Patent Office 2,959,090
Patented Nov. 8, 1960

2,959,090

DEVICE FOR INSPECTING A BODY SURROUNDED BY, OR COMPOSED OF, HOT GASES

Ronald Milton Davies, Kitchener, Ontario, Canada, assignor to Orenda Engines Limited, Malton, Ontario, Canada Filed June 16, 1958, Ser. No. 742,226

6 Claims. (Cl. 88—14)

This invention relates to a device for optically inspecting an illuminated or light-emitting body, and is particularly concerned with a device for inspecting a body which is positioned in or comprises a stream of hot gaseous fluid. The term "body" is used herein and in the appended claims to include any solid mass or any incandescent mass of gaseous fluid such as a flame, or a translucent or opaque mass of gaseous fluid.

An important use of the device according to the invention is to enable a flame in an afterburner structure of a gas turbine engine for an aircraft to be observed whilst the engine is operating in a test cell.

In previously proposed devices for viewing the flame in such an afterburner it has been necessary to position the devices downstream of the usual silencer of the test cell, this being due to the fact that the temperature encountered in the silencer or between the tailpipe of the engine and the silencer is such as to damage the inspection device unless that device is adequately cooled. Heretofore, it has not been thought practical or feasible to adequately cool such an inspection device and consequently, it has been found necessary to view the afterburner flame from a position downstream of the silencer.

This procedure, however, involves the disadvantage that the afterburner flame must then be viewed through steam generated by the normal water cooling system of the silencer.

An object of this invention is to provide an inspection device which is specifically adapted to view a flame in an afterburner of an aircraft gas turbine engine from a position intermediate a tailpipe of the engine and a silencer of a test cell, or from a position within a silencer of the test cell.

Additional problems arise when viewing a flame in an afterburner of a gas turbine engine. For example, as combustion within the engine is rarely complete, the exhaust from the engine almost invariably includes particles of carbon and other products of incomplete combustion which tend to obstruct or fog optical elements of the viewing device, thus reducing the amount of light passing through that device and in turn modifying the indications given by recording instruments associated with that device. Also, as the device must be located in a high velocity stream of gaseous fluid, the device is subjected to vibrations arising from buffeting of portions of the device positioned in the gas flow, which vibrations must be isolated from sensing components associated with the device.

Further objects of the invention are to provide an inspection device in which the obstruction or fogging of optical elements of the device is eliminated or mitigated, and in which vibrations occurring in the device are adequately isolated from recording instruments associated with the device.

As will be readily appreciated, the device of the invention has application other than in the viewing of an afterburner flame of a gas turbine engine, and may be used, for example, in conjunction with measuring instruments to provide an optical pyrometer for remotely measuring the temperature of any incandescent or light-emitting solid or gaseous mass.

According to the invention, the inspection device includes a first tubular member defined by at least one wall which converges axially towards one end of the member to provide a pinhole inlet to the interior of the member for light, a second tubular member defined by at least one wall surrounding and spaced from the wall of the first tubular member and converging axially towards that end of the second tubular member which is adjacent the convergent end of the first tubular member for the first and second members in combination to define an annular space, means for supplying gaseous fluid under pressure to said annular space, and means constraining said fluid to flow from said annular space through an outlet provided by the convergent ends of the first and second members and surrounding the inlet provided by the first member.

According to a further feature of the invention, gaseous fluid under pressure is supplied to the interior of the first tubular member and is constrained to pass through the said pinhole inlet to keep the pinhole inlet clear of obstruction, and also to eliminate the passage into the interior of the first member of gases carrying matter which would fog optical elements located within that member.

According to another feature of the invention, the means for constraining the gaseous fluid to flow from the annular space through the said outlet is resilient and provides an isolator between the first and second members mitigating the transmission to the first member of vibrations set up in the second member when the device is positioned in a high velocity flow of gaseous fluid. Preferably the first and second members are supported independently in order that the said means for constraining the gaseous fluid to flow from the annular space through the said outlet may effectively isolate the first member from vibrations occurring in the second member.

According to a still further feature of the invention, means are provided for spraying a liquid onto the exterior surface of the second member to further enhance the cooling of that member.

Further objects and advantages of the invention will become apparent from a study of the following specification when taken in conjunction with the accompanying drawings, in which, Figure 1 is a diagrammatic side elevation showing the inspection device of the invention positioned within a silencer of a test cell, and immediately adjacent the downstream end of a gas turbine engine;

Figure 2 is a sectional elevation of the device according to the invention taken longitudinally of the axis of the device.

Figure 3 is a section taken on the line 3—3 of Figure 2; and,

Figure 4 is a section taken on the line 4—4 of Figure 2.

Referring now to Figure 1, a gas turbine engine is indicated generally at 10, the engine having an inlet 11 and a tailpipe 12 in which is positioned an afterburner structure indicated generally at 13. A silencer of a test cell for the engine is indicated at 14, the silencer including a gallery 15 to which water under pressure is supplied, the gallery having holes by means of which the water may be sprayed onto the interior and exterior surfaces of the silencer.

Extending through the wall of the silencer is the inspection device according to the invention, which is indicated generally at 16 and which will now be described with particular reference to Figures 2 to 4.

The device according to the invention comprises a first tubular member provided by a first tubular portion 20, a second tubular portion 21, and a portion indicated at 22 which provides a transition between the portions 20 and 21 for those portions to be arranged with their axes at right angles to each other. At the free end of the portion 20 is a frusto-conical tubular extension 23 which converges away from the free end of the portion 20 to define a pinhole inlet 24 by means of which light may be admitted to the interior of the first tubular member.

By the term "pinhole inlet" as used herein and in the appended claims is meant a hole of sufficiently small dimension for it to function in the manner well known with respect to a pinhole camera, i.e. the hole is sufficiently small to produce an inverted image, approximately in focus, within the first tubular member of an object with which the axis of the portion 20 is aligned.

Surrounding the first tubular member is a second tubular member provided by a third tubular portion 25, a fourth tubular portion 26 arranged with its axis at right angles to the axis of the portion 25, and a portion 27 which provides a transition between the portions 25 and 26. A frusto-conical tubular extension 28 extends from the free end of the portion 25 and surrounds the frusto-conical extension 23 of the first tubular member.

The first and second tubular members in combination define an annular space, indicated generally at 30, and the frusto-conical extensions 23 and 28, in combination, provide a nozzle, the outlet of which is indicated generally at 31.

Encircling the extension 28 adjacent its end providing the outlet 31, is a gallery 32 to which a fluid under pressure can be supplied from a conduit 33, the gallery 32 having perforations 34 by means of which the fluid can be sprayed onto the exterior surface of the extension 28.

Positioned within the first tubular portion 20 is a lens 35 which converts the divergent rays of light entering the first member through the pinhole 24 into parallel rays of light, the parallel rays then being directed into a prism 36 located within the transitional portion 20 which serves to direct the rays into the second tubular portion 21 and towards a second lens 37 providing an objective of the device.

The second lens 37, in addition to providing an objective for the device, also provides a closure member for the adjacent end of the second tubular portion 21, and the first lens 35, as will be observed more particularly from a study of Figure 3, is mounted in a ring 38 provided at its inner periphery with a series of axial grooves 39 which extend completely through the ring to provide passages around the edge of the lens.

The fourth tubular portion 26, and thus the second tubular member, is supported exteriorly of the silencer by a member 40, and the second tubular portion 21, and thus the first tubular member, is supported by a member 41 located within the member 40, the members 40 and 41 being mounted on a common plate 42 which may be supported from a stationary structure in any convenient manner.

The first tubular portion 21 carries a ring 43 which is connected to the free end of the tubular portion 26 by a bellows device 44, and extending through the ring 43 is an inlet conduit 45 for compressed air, a similar conduit, 46, for compressed air extending through the wall of the tubular member 21.

The operation of the device in use is as follows:

Compressed air is supplied to the conduits 45, 46 at a pressure, for example, of 65 lbs. per square inch, and thus the compressed air is supplied to the annular space 30 and to the interior of the first tubular member.

The compressed air supplied along the conduit 46 to the interior of the first tubular member is constrained by the lens 37 to flow past the prism 36 and through the passages 39 around the edges of the lens 35 and out through the pinhole inlet 24, thus serving to cool the first tubular member and its associated optical devices and to keep the pinhole inlet 24 clear of obstruction by particles of carbon or other debris. The compressed air also serves effectively to purge the interior of the first tubular member of any gases containing debris or incomplete products of combustion, and in this way, ensures that the optical devices 35 to 37 and the pinhole inlet 24 are maintained at all times in an unobstructed and uncontaminated condition.

The compressed air supplied along the conduit 45 to the annular space 30 similarly is constrained by the bellows device 44 to flow along the annular space and out through the nozzle outlet 31, thus effectively scouring the complete exterior surface of the first tubular member, and effectively serving to cool that member. In addition, the air passing through the outlet 31 provided by the frusto-conical extensions 23 and 28 serves effectively to blanket the pinhole inlet 24 and to deflect particles approaching that inlet, thus further ensuring that the pinhole inlet will not become obstructed.

Fluid, for example water, is supplied along the conduit 33 and is sprayed from the perforations 34 of the gallery 32 onto the exterior surface of the frusto-conical extension 28, and is carried along the surface of that extension and over the exterior surface of the tubular portion 25 by the flow of gas past the device. Optionally, the conduit 33 may be provided with perforations 33a which serve to spray the fluid onto the exterior surface of the tubular portion 26. The fluid sprayed onto the exterior of the second tubular member serves effectively to cool that member, which in turn increases the cooling capacity of the compressed air supplied to the annular space 30.

The inspection device is shown in the drawings as being positioned for it to look directly into the tailpipe of the gas turbine engine 12, which means that a pressure will be exerted on the device by the exhaust gases leaving the tailpipe of the engine. The pressure exerted by these gases can be measured or calculated, and preferably the pressure of the compressed air supplied to the interior of the first tubular member and to the annular space 30 is such that it is about 35 lbs. per square inch more than the pressure exerted by the products of combustion from the engine, thus ensuring that the products of combustion do not "blow-back" into the device.

Additionally, the pressure exerted by the exhaust gases leaving the tailpipe, combined with buffeting action of those gases due to various turbulences in the flow will tend to set up violent vibrations in the second tubular member. To mitigate the transmission of these vibrations to the first tubular member, the first and second tubular members are independently supported, as hereinabove described, the bellows device 34 interconnecting the first and second tubular members effectively serving to mitigate the transmission of vibrations between those members.

The inspection device of the invention may be used in conjunction with the naked eye for viewing the flame in the afterburner or any other structure within the tailpipe, or, the device may be used in association with indicating and recording instruments in the manner of an optical pyrometer. Also, the device of the invention may be used in locations other than for viewing the flame of an afterburner of a gas turbine engine, for example, it can advantageously be used for viewing the interior of a combustion chamber of the engine, or a flame therein, or in any other location where an optical inspection device or optical pyrometer is necessary.

What I claim as my invention is:

1. In an inspection device for viewing a body through a stream of hot gaseous fluid, a telescope barrel including a first tubular member comprised by first and second tubular portions arranged with their longitudinal axes at an angle to each other, a transitional tubular portion between the first and second portions, and a frusto-conical tubular extension at that end of the first portion which is remote from the transitional portion, the frusto-conical extension defining a pinhole inlet for light to the interior of the first tubular member; a second tubular member surrounding and spaced from the first tubular member to define an annular space between the first and second tubular members, said second tubular member being comprised by third and fourth tubular portions surrounding the first and second tubular portions of the first member, respectively, and a transitional portion and a frusto-conical tubular extension surrounding the transitional portion and the frustro-conical tubular extension of the first member, respectively, the frusto-conical extensions of the first and second members providing in combination a nozzle surrounding said pinhole inlet to the first member; light reflecting means positioned within the transitional portion of the first tubular member for changing the direction of light entering the first tubular portion through said pinhole inlet and for directing that light into the second tubular portion; means for supplying gaseous fluid under pressure to the interior of the first tubular member and to the annular space between the first and second tubular members; means associated with the first and second tubular members for constraining the gaseous fluid to flow through the pinhole inlet provided by the frusto-conical extension of the first member and through the nozzle provided by the frusto-conical extensions of the first and second members in combination; and a perforated gallery to which liquid under pressure can be supplied surrounding the frusto-conical extension of a second tubular member adjacent said outlet and adapted to spray said liquid onto the exterior surface of that member.

2. A telescope barrel according to claim 1, in which the first and second tubular members are interconnected through a resilient bellows device which provides an isolator mitigating the transmission of vibration between the first and second tubular members.

3. A telescope barrel according to claim 1, including means for independently supporting the first and second members, and in which the first and second tubular members are interconnected through a resilient bellows device which provides an isolator mitigating the transmission of vibration between the first and second tubular members.

4. A telescope barrel according to claim 1, including at least one lens positioned within the first tubular member for modifying the path of light through that member.

5. A telescope barrel according to claim 1, in which the device is positioned in the stream of hot gaseous fluid for the frusto-conical extensions to converge in a direction which is upstream of the flow past the device, the gallery being located at the upstream end of the extension of the second member.

6. A telescope barrel according to claim 1, in which the light reflective means is an optical prism.

References Cited in the file of this patent

UNITED STATES PATENTS

| | | |
|---|---|---|
| 767,624 | Bedell et al. | Aug. 16, 1904 |
| 2,232,594 | Dike | Feb. 18, 1941 |
| 2,611,541 | Gray | Sept. 23, 1952 |
| 2,761,072 | Wormser | Aug. 28, 1956 |
| 2,814,953 | Callaghan | Dec. 3, 1957 |

OTHER REFERENCES

Beral, article in the Photographic Journal, vol. 89B, section B, 1949, page 103.

Technical Data Digest, Central Air Documents Office, vol. 15, No. 6, page 10, June 1, 1950.